United States Patent
Cankaya et al.

(10) Patent No.: US 7,865,591 B2
(45) Date of Patent: Jan. 4, 2011

(54) FACILITATING DHCP DIAGNOSTICS IN TELECOMMUNICATION NETWORKS

(75) Inventors: Hakki Candan Cankaya, Dallas, TX (US); Gerard Damm, Plano, TX (US); Kamakshi Sridhar, Plano, TX (US); Sven Ooghe, Gentbrugge (BE)

(73) Assignee: Alcatel Lucent, Paris (FR)

( * ) Notice: Subject to any disclaimer, the term of this patent is extended or adjusted under 35 U.S.C. 154(b) by 467 days.

(21) Appl. No.: 11/986,265

(22) Filed: Nov. 20, 2007

(65) Prior Publication Data
US 2009/0132696 A1    May 21, 2009

(51) Int. Cl.
*G06F 15/173* (2006.01)
(52) U.S. Cl. ...................................... 709/224
(58) Field of Classification Search .................. 709/224, 709/245
See application file for complete search history.

(56) References Cited

U.S. PATENT DOCUMENTS 7,587,028 B1 * 9/2009 Broerman et al. ........ 379/15.03

2006/0248229 A1 * 11/2006 Saunderson et al. ......... 709/245

OTHER PUBLICATIONS

Woundy et al., "DHCP Lease Query", Apr. 2006, Internet: ietf.org, p. 1-28.*

* cited by examiner

*Primary Examiner*—Vivek Srivastava
*Assistant Examiner*—Taylor Elfervig
(74) *Attorney, Agent, or Firm*—Galasso & Associates, LP

(57) ABSTRACT

A computer-implemented method for facilitating DHCP diagnostic functionality comprises a plurality of operation. An operation is performed for identifying misconfigurations to a DHCP option configuration of a DHCP agent between a DHCP server and a client of the DHCP server. An operation is performed for confirming proper address concentration configuration with respect to the DHCP agent. An operation is performed for snooping on address assignments from the DHCP server to the client of the DHCP server to determine unauthorized ones of the address assignments.

18 Claims, 2 Drawing Sheets

FACILITATING DHCP DIAGNOSTICS IN TELECOMMUNICATION NETWORKS

FIELD OF THE DISCLOSURE

The disclosures made herein relate generally to diagnostic tools used in telecommunication networks and, more particularly, to facilitating Dynamic Host Configuration Protocol (DHCP) diagnostics in telecommunication networks.

BACKGROUND

DHCP is used to allocate IP addresses and host configuration parameters. DHCP servers assume responsibility to distribute the IP addresses and configuration parameters, and maintain databases for bookkeeping purposes. Examples of such types of databases include, but are not limited to, an address pool, a binding database, and databases containing other known types of information.

In some telecommunication architectures where there are numerous customer hosts to be served, a node relatively close to the customer plays a relay agent role. This role is referred to herein as DHCP agent, which can include a DHCP agent of any kind (e.g., relay agent, intermediate agent or the like) between a DHCP server and a client of the DHCP server. In performing this role, the DHCP agent replaces the hosts' addresses with its own address as the source of the request going upstream to the DHCP server for reasons such as scalability of the architecture. The DHCP agent also assumes responsibility to insert some information to correctly identify the customer to the DHCP server. This information is needed for the DHCP server to recognize customer credentials and to assign IP address(es) and/or configuration parameters accordingly. Additionally, the DHCP agent and some other nodes along the path between the server and the host also perform some snooping of addresses and parameters assigned to the customer. This snooping is performed to detect unauthorized attempts for service usages.

Because almost all of the abovementioned DHCP agent features are manually configurable, any one of these features can possibly lead to a service anomaly and/or a network anomaly. A service anomaly can be in the form of either serving customer below or over its SLA. Such anomalies may reveal themselves by a customer complaint, unless they are diagnosed proactively. For example, the operator can notice congestion in the network anomaly case. However, there might be many other reasons for similar service and network anomalies, only one of which is DHCP-related.

Presently, there are no available tools that provide for specifically facilitating DHCP diagnostics. To be useful, such a tool must diagnose any DHCP related issues that cause the anomalies mentioned above. Therefore, facilitating DHCP diagnostic functionality in a manner that determines if DHCP-related activities/configurations causing service and/or network anomalies would be advantageous, desirable and useful.

SUMMARY OF THE DISCLOSURE

Embodiments of the present invention diagnoses potential DHCP-related problems for which there was previously no computer-implemented means for being checked by any other mechanism. To this end, embodiments of the present invention facilitate diagnosing of DHCP-caused anomalies in network architecture (e.g., customer service and/or a network). In one embodiment of the present invention, means (e.g., separate DHCP diagnostic engines) is provided for checking different DHCP functionality that is potentially creating an anomaly in the network architecture. These tools use in-band or out-of-band mechanisms, either proactively or on an on-demand basis. DHCP diagnostics in accordance with the present invention not only check the configuration, but also interpret the configuration to see if it translates into a correct set of services for client. Such tools are valuable for ensuring that detected or expected service/network anomalies are not related with DHCP functionality.

In one embodiment of the present invention, a computer-implemented method for facilitating DHCP diagnostic functionality comprises a plurality of operation. A first operation is performed for identifying misconfigurations (e.g., unintended modifications) to a DHCP option configuration of a DHCP agent between a DHCP server and a client of the DHCP server. There can be multiple DHCP agents in a particular network system, and such misconfigurations can happen at any DHCP agent that is between DHCP server and the client, including the first DHCP agent that is closest to the client. An operation is performed for confirming proper address concentration configuration with respect to the DHCP agent. An operation is performed for snooping on address assignments from the DHCP server to the client of the DHCP server to determine unauthorized ones of the address assignments.

In another embodiment of the present invention, a network management system is configured for facilitating DHCP diagnostic functionality. The network management system comprises a first DHCP diagnostic engine and a second DHCP diagnostic engine. The first DHCP diagnostic engine is configured for identifying misconfigurations to a DHCP option configuration of a DHCP agent between a DHCP server and a client of the DHCP server and for confirming proper address concentration configuration with respect to the DHCP agent. The second DHCP diagnostic engine is configured for snooping on address assignments from the DHCP server to the client of the DHCP server to determine unauthorized ones of the address assignments.

In another embodiment of the present invention, a data storage device has a set of processor-executable instructions stored thereon. The set of processor-executable instructions comprises instructions identifying misconfigurations to a DHCP option configuration of a DHCP agent between a DHCP server and a client of the DHCP server, instructions for confirming proper address concentration configuration with respect to the DHCP agent, and instructions for snooping on address assignments from the DHCP server to the client of the DHCP server to determine unauthorized ones of the address assignments.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
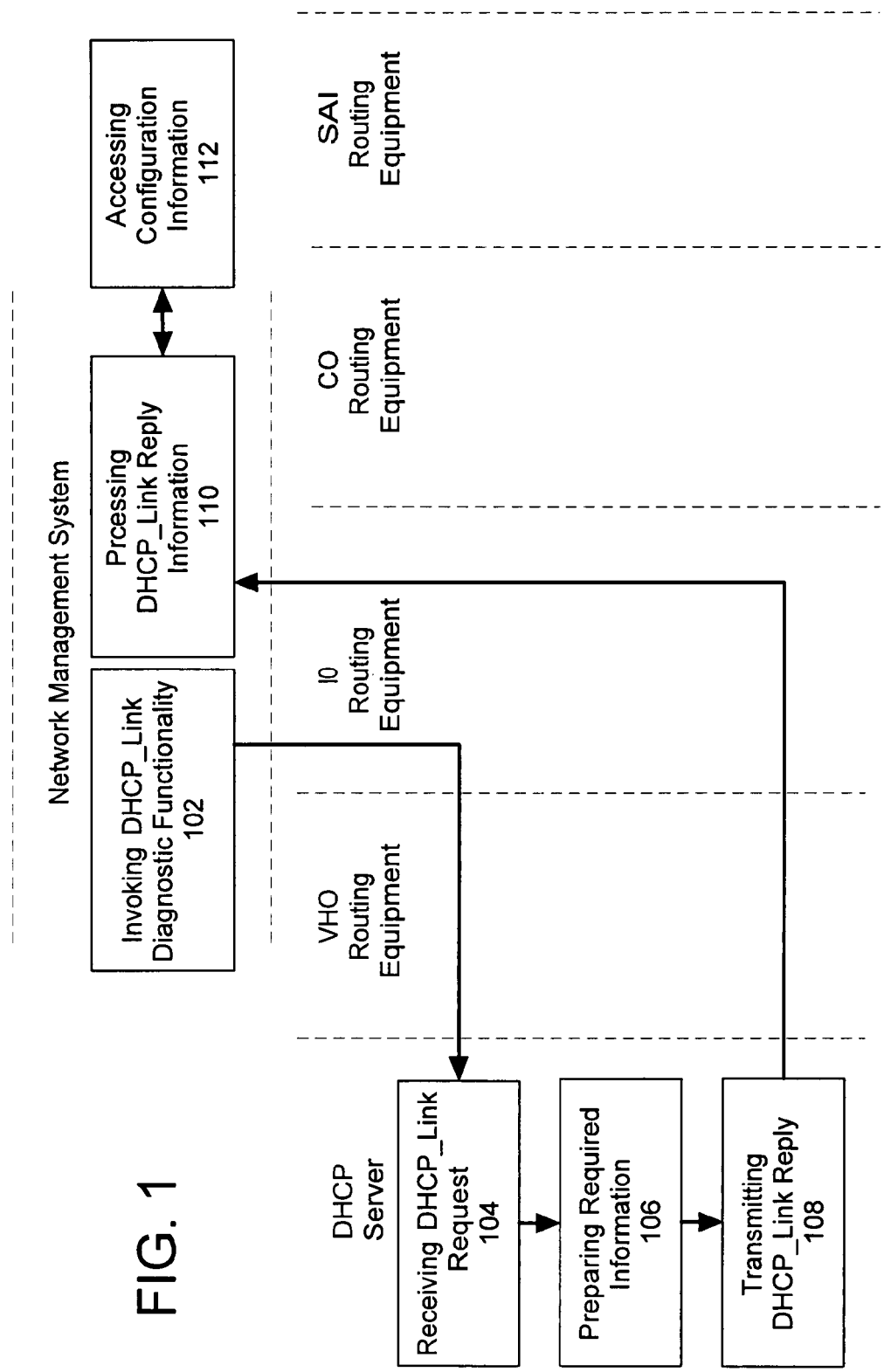
FIG. 1 is a flow chart showing an implementation of DHCP diagnostic functionality in accordance with the present invention, which is specifically configured for facilitating identification of misconfigurations to DHCP option configurations and/or for confirming proper address concentration.

Embodiments of the present invention are configured for diagnosing potential DHCP-related problems. Such embodiments preferably use in-band mechanisms for implementing such DHCP diagnostic functionality because it provides better coverage for identifying potential DHCP-related problems. In addition to checking DHCP-related configuration information, DHCP diagnostic functionality in accordance with the present invention also interprets such DHCP-related configuration information to verify that it translates into a correct set of services for a respective client.

DHCP diagnostic functionality in accordance with the present invention can be facilitated by a set of diagnostic tools (e.g., computer-implemented engines) configured for diagnosing DHCP-caused anomalies in customer service and/or network settings. Such a set of diagnostic tools includes tools that check different respective DHCP features that are potentially creating an anomaly. More specifically, such a set of tools can be configured to perform the operations of identifying misconfigurations to a DHCP option configuration of a DHCP agent between a DHCP server and the client, confirming proper address concentration configuration with respect to the DHCP agent, and snooping on address assignments from the DHCP server to a client of the DHCP server to determine unauthorized ones of the address assignments. In one embodiment, a first tool is configured for identifying unwanted modifications to configuration of DHCP option 82 and its suboptions at the DHCP agents between the DHCP server and the client, and for facilitating confirmation of address concentration configurations (i.e., referred to herein as a DHCP_Link diagnostic functionality), while a second tool is configured for identifying anomalies relating to IP and MAC address spoofing (i.e., referred to herein as a DHCP_Spoofright diagnostic functionality). These tools can use in-band and/or out-of-band mechanisms and can be invoked either proactively or on an on-demand basis. Accordingly, such a set of tools is valuable in that it ensures that detected or expected service/network anomalies are not being caused by DHCP functionality.

DHCP option 82 is one example of an option that can be misconfigured. DHCP option 82 enables a DHCP agent to include information about itself when forwarding client-originated DHCP packets to a DHCP server. In this manner, the DHCP server can use this information to implement IP address or other parameter-assignment policies.

In the case where there are multiple DHCP agents between a client and a DHCP server, there is a possibility that one or more of the DHCP agents have incorrectly modified options/suboptions originally set by a first DHCP agent (i.e., the originating DHCP agent) that is the closest to the client. It is also possible that a DHCP agent may discard the entire DHCP packet, if it does not recognize the previous DHCP agent via its "giaddr" field in the DHCP packet header. These errors may cause a misidentification of the client at the DHCP server level, which can lead to some service anomaly at the client's end. Normally, the DHCP agents are not supposed to change or negatively affect any options/suboptions set by an originating DHCP agent. The situation can exist, however, where DHCP agents are mis-configured in a manner that causes them to adversely and/or unintentionally modify these options, or decide to drop the options because of MTU conflicts or the like. In view of such potential anomalies and their respective cause(s), DHCP_Link diagnostic functionality in accordance with the present invention can be facilitated for checking DHCP agent information (e.g., options/suboptions) that are inserted by an originating DHCP agent and the corresponding information recorded in the binding database in the DHCP server on behalf of the client.

Address concentration is another configurable feature at a DHCP agent and can also be checked using DHCP_Link diagnostic functionality in accordance with the present invention. If configured correctly, a DHCP agent implementing address concentration is supposed to replace client address with its own respective addresses as the main source addresses for DHCP requests. This is done so that the associated core network learns only DHCP agent addresses. Thus, implementation of address concentration in this manner significantly alleviates scalability issues for broadcast floods. Additionally, a DHCP agent implementing address concentration might also be configured to change broadcast addresses to a unicast server address for further cut-back excess traffic in core network. Because these address concentration related options are configured at each DHCP agent, they are vulnerable to misconfigurations. Accordingly, DHCP_Link diagnostic functionality in accordance with the present invention can be configured and used for checking such configurations. Through such checking, the network anomaly of flooding reveals itself with unexpected congestions in the network and service sufferings from customers.

Referring now to FIG. 1, it is disclosed herein that DHCP_Link diagnostic functionality in accordance with the present invention is preferably implemented in an in-band manner. DHCP_Link diagnostic functionality is initiated by a network management system (NMS) such as that at a DHCP agent (i.e., Intermediate Office (IO) routing equipment) where DHCP agent options/suboptions are originally inserted and/or where address concentration is performed. A skilled person will understand that the IO is simply one example of a specific network architecture component implemented in accordance with an embodiment of the present invention. More broadly, in other embodiments, such an architecture component can be in any office or location (e.g., CO in the network architecture where the first agent (towards the customer site) resides in such network architecture. Examples of routing equipment as used in conjunction with the present invention include, but are not limited to, service routers, Ethernet service switches, ATM (Asynchronous Transfer Mode) Subscriber Access Multiplexer, and the like. Initiation of DHCP_Link diagnostic functionality includes performing an operation 102 for invoking DHCP_Link diagnostic functionality, which includes transmitting a DHCP_Link request from the NMS for reception by a DHCP server. In response to the DHCP server performing an operation 104 for receiving the DHCP_Link request, the DHCP server performs an operation 106 for preparing information as required for responding to the DHCP_Link request. Thereafter, the DHCP server performs an operation 108 for transmitting a DHCP_Link reply for reception by the NMS. In response to receiving the DHCP_Link reply, the NMS performs an operation 110 for processing information contained in the DHCP_Link reply and, if necessary for processing such DHCP_Link reply information, performs an operation 112 for accessing configuration information (e.g., previously received DHCP_Link reply information). As shown, the DHCP_Link request and DHCP_Link reply are each transmitted through one or more DHCP agents (i.e., IO routing equipment and Video Hub Office (VHO) routing equipment).

With respect to utilizing DHCP_Link diagnostic functionality for facilitating DHCP agent information confirmation (i.e., confirmation of options/suboptions), in one embodiment, the DHCP_Link request utilizes DHCP leasequery for requesting DHCP agent information from the DHCP server that maintains an address binding database in a stable storage device (e.g., requested in the DHCP_Link request). In response to such request for DHCP agent information, the DHCP server sends back previously recorded parameters for the DHCP agent including required options/suboptions (e.g., transmitted in the DHCP_Link request). If the returned information (e.g., values) differs from previously received information that was originally sent, then it is assumed that an error or a misconfiguration in one of the DHCP agents has been discovered. Thus, facilitating DHCP_Link diagnostic functionality for performing DHCP agent information confirmation will assist in confirming that an uninterrupted DHCP link (e.g., no change in options/suboptions by DHCP agents) exists between the DHCP server and the initiating DHCP agent.

With respect to utilizing DHCP_Link diagnostic functionality for facilitating address concentration confirmation, in one embodiment, the DHCP_Link probe requests information relating to a MAC address that is bound to a specific IP address leased to a client. If configured for address concentration, this MAC address should be an address of the DHCP agent, as opposed to that of the client. In one exemplary application, DHCP_Link diagnostic functionality utilized for facilitating address concentration confirmation can be proactively used when there is congestion from an unexpected flooding potentially caused by the wrong address concentration configuration.

Turning now to a discussion of DHCP_Spoofright diagnostic functionality, DHCP agents between DHCP server and the client can be configured in accordance with the present invention to snoop on address assignments from the DHCP server to the client in order to keep track of the relationship between user interfaces and their assigned IP addresses and/or MAC addresses. Snooping refers to capturing network traffic for analysis of such traffic. With respect to DHCP_Spoofright diagnostic functionality, snooping is done so that any spoofing coming from a user side device (e.g., client side device attempting unauthorized address assignment) is recognized as unauthorized. In one example, this snooping involves a basic table look-up being used for checking any address coming from a user against the assigned addresses for that user. So that integrity of the look-up table is not adversely affected, maintenance of the table must be done properly (e.g., without errors). If the table look-up procedure or its maintenance have been corrupted and/or hacked or the table is not implemented with a stable storage capability where a restart after a failure may not successfully load the table back to its previous state, then malicious users can gain access to related network services, or legitimate user service requests can be incorrectly labelled as spoofing attempts and denied service. These situations result in service disruption being experienced by the client, which result in customer complaints about connectivity. In this case, a legitimate service suffers because of an over-spoofing, which means that a legitimate customer service request is treated as an unauthorized attempt for service theft. Additionally, an operator can experiences a negative effect if an unauthorized attempt for address assignment makes its way to the network unrecognised, in which case there likely won't be any customer complaint and the problem can remain undetected for a considerable time. To this end, advantageously, DHCP_Spoofright diagnostic functionality is configured for checking for DHCP-related causes for such spoofing.

Figure 2:
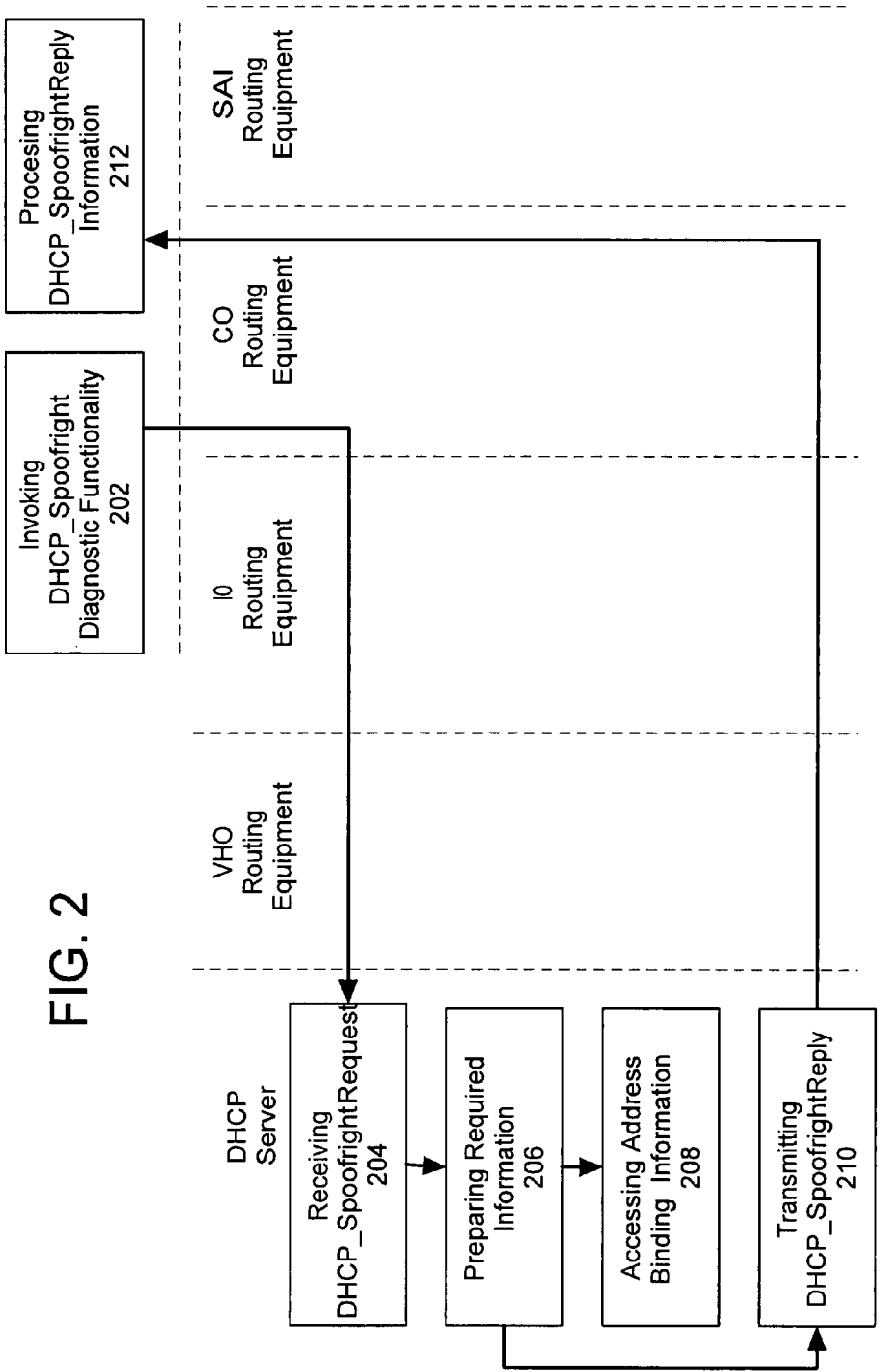
FIG. 2 is a flow chart showing an implementation of DHCP diagnostic functionality in accordance with the present invention, which is specifically configured for determining unauthorized address assignments.

Referring now to FIG. 2, it is disclosed herein that DHCP_Spoofright diagnostic functionality in accordance with the present invention is preferably implemented in an in-band manner. DHCP_Spoofright diagnostic functionality is initiated by a network NMS such as for example at a DHCP agent (e.g., CO routing equipment) where an instance of spoofing is being checked. A skilled person will understand that the location in network where an instance of spoofing is being checked is wherever it is suspected that spoofing is performed, not necessarily in the CO. Initiation of the DHCP_Spoofright diagnostic functionality includes performing an operation 202 for invoking DHCP_Spoofright diagnostic functionality, which includes transmitting a DHCP_Spoofright request from the NMS for reception by a DHCP server. In response to the DHCP server performing an operation 204 for receiving the DHCP_Spoofright request, the DHCP performs an operation 206 for preparing information as required for responding to the DHCP_Spoofright request. In conjunction with preparing the information required for responding to the DHCP_Spoofright request, the DHCP server performs an operation 208 for accessing address binding information from a binding database thereof. Thereafter, the DHCP server performs an operation 210 for transmitting a DHCP_Spoofright reply for reception by the NMS. In response to receiving the DHCP_Spoofright reply, the NMS performs an operation 212 for processing information contained in the DHCP_Spoofright reply. As shown, the DHCP_Spoofright request and the DHCP_Spoofright reply are each transmitted through one or more DHCP agents (i.e., central office (CO) routing equipment, IO routing equipment and Video Hub Office (VHO) routing equipment). Optionally, in other embodiments, the DHCP_Spoofright request and the DHCP_Spoofright reply can each be transmitted through the Service Area Interface (SAI) routing equipment, the CO routing equipment, the IO routing equipment and the Video Hub Office (VHO) routing equipment.

With respect to utilizing DHCP_Spoofright diagnostic functionality for facilitating identification of anomalies relating to IP and MAC address spoofing, in one embodiment, the DHCP_Spoofright request uses DHCP leasequery mechanism as defined in RFC (Request for Comments) 4388. Any DHCP snooping node (a.k.a. DHCP aware node) will typically be able to use DHCP_Spoofright diagnostic functionality in accordance with the present invention to check the integrity of anti-spoofing against spoofing-related anomalies mentioned above. For example, assuming that the CO routing equipment is a snooping agent that maintains the relationship between client ID, MAC address, and the assigned IP address in order to catch potential spoofing activity from the untrustworthy client side, and assuming that the CO routing equipment restarts in an unstable state after a failure where the binding of the client MAC address and its assigned IP address are now inaccessible, this situation can potentially cause a legitimate service to be refused as an unauthorized attempt by the DSLAM. In such a case, DHCP_Spoofright would utilize DHCP leasequery with its IP address in the "giaddr" as the requester to ask for either the leased IP address for a given client MAC address (query by MAC address) or the MAC address for a given leased IP address (query by IP address) from the DHCP server. Then, the DHCP server would respond with the latest lease binding information from its binding database, which is maintained in a stable storage. DHCP_Spoofright can choose to use client ID to ask both IP and MAC addresses bound to a given client in case that both IP address and MAC address are under scrutiny.

It is disclosed herein that DHCP_Spoofright diagnostic functionality can be used both proactively and on-demand. When there is a customer complaint about the service connectivity, DHCP_Spoofright diagnostic functionality can be used on-demand to eliminate the fact that such service connectivity issue is being caused by an incorrect anti-spoofing. In proactive usage, DHCP_Spoofright diagnostic functionality can be used in areas of a network that are exhibiting congestion for the purpose of detecting unauthorized usage that was given access by unintended and/or unauthorized anti-spoofing practices.

Referring now to instructions processible by a data processing device, it will be understood from the disclosures made herein that methods, processes and/or operations adapted for carrying out DHCP diagnostic functionality as disclosed herein are tangibly embodied by computer readable medium having instructions thereon that are configured for carrying out such functionality. In one specific embodiment, the instructions are tangibly embodied for carrying out the methodology as disclosed in reference to FIG. 1 and/or FIG. 2. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out DHCP diagnostic functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A computer-implemented method for facilitating DHCP diagnostic functionality, comprising:
   identifying misconfigurations to a Dynamic Host Configuration Protocol (DHCP) option/suboption configuration of a DHCP agent between a DHCP server and a client of the DHCP server;
   confirming proper address concentration configuration with respect to the DHCP agent;
   snooping on address assignments from the DHCP server to the client of the DHCP server to determine unauthorized ones of said address assignments; and
   interpreting DHCP-related configuration information to verify that said configuration information translates into a correct set of services for a client thereof, wherein said configuration information includes information relating to misconfiguration to the DHCP option/suboption configuration, information relating to proper address concentration configuration with respect to the DHCP agent, and information relating to address assignments from the DHCP server to the client of the DHCP server;
   wherein identifying misconfigurations to the DHCP option configurations includes:
   a DHCP Link probe function utilizing a DHCP leasequery function for requesting DHCP agent information from a binding database maintained by the DHCP server;
   receiving from the DHCP server said DHCP agent information;
   determining that said received DHCP agent information differs from DHCP agent information previously received from the DHCP server thereby discovering misconfiguration of said received DHCP agent information.

2. The method of claim 1 wherein the DHCP option includes a DHCP option that enables a DHCP agent to include information about itself in a client-originated DHCP packet when forwarding the client-originated DHCP packet to the DHCP server.

3. The method of claim 1 wherein identifying said misconfigurations includes verifying DHCP agent information modified by an originating agent and corresponding information recorded in a binding database of the DHCP server on behalf of the client.

4. The method of claim 1 wherein confirming proper address concentration configuration includes confirming that the DHCP agent is properly configured for replacing client addresses with its own addresses as the main source addresses for DHCP requests.

5. The method of claim 1 wherein confirming proper address concentration configuration includes verifying that the DHCP agent is configured for changing broadcast addresses to a unicast server address for further cut-back from the excess traffic in the core.

6. The method of claim 1 wherein confirming proper address concentration configuration includes:
   receiving information relating to a MAC address that is bound to a specific IP address; and
   assessing said MAC address related information for verifying that said bound MAC address is a MAC address of the DHCP agent.

7. The method of claim 1 wherein snooping on said address assignments includes:
   monitoring a relationship between a user interface and a respective assigned network address; and
   identifying an unauthorized attempt of modifying said relationship in conjunction with said monitoring.

8. The method of claim 7 wherein:
   monitoring said relationship between the user interface and the respective assigned network addresses includes creating a look-up table having correlated therein the user interface and the respective assigned network address; and
   identifying said unauthorized attempts includes verifying a network address received from the user against the respective assigned network address in the lookup table corresponding to the user.

9. A network management system configured for facilitating DHCP diagnostic functionality, comprising:
   a first DHCP diagnostic engine configured for identifying misconfigurations to a Dynamic Host Configuration Protocol (DHCP) option/suboption configuration of a DHCP agent between a DHCP server and a client of the DHCP server and for confirming proper address concentration configuration with respect to the DHCP agent; and a second DHCP diagnostic engine configured for snooping on address assignments from the DHCP server to the client of the DHCP server to determine unauthorized ones of said address assignments;

wherein at least one of the first DHCP diagnostic engine and the second DHCP diagnostic engine is configured for interpreting DHCP-related configuration information to verify that said configuration information translates into a correct set of services for a client thereof;

wherein said configuration information includes information relating to misconfiguration to the DHCP option/suboption configuration, information relating to proper address concentration configuration with respect to the DHCP agent, and information relating to address assignments from the DHCP server to the client of the DHCP server;

wherein identifying misconfigurations to the DHCP option configurations includes:

a DHCP Link probe function utilizing a DHCP leasequery function for requesting DHCP agent information from a binding database maintained by the DHCP server;

receiving from the DHCP server said DHCP agent information;

determining that said received DHCP agent information differs from DHCP agent information previously received from the DHCP server thereby discovering misconfiguration of said received DHCP agent information.

10. The system of claim 9 wherein the DHCP option includes a DHCP option that enables a DHCP agent to include information about itself in a client-originated DHCP packet when forwarding the client-originated DHCP packet to the DHCP server.

11. The system of claim 9 wherein identifying said misconfigurations includes verifying DHCP agent information modified by an originating relay agent and corresponding information recorded in a binding database of the DHCP server on behalf of the client.

12. The system of claim 9 wherein confirming proper address concentration configuration includes confirming that the DHCP agent is properly configured for replacing client addresses with its own addresses as the main source addresses for DHCP requests.

13. The system of claim 9 wherein confirming proper address concentration configuration includes verifying that the DHCP agent is configured for changing broadcast addresses to a unicast server address for further cut-back from the excess traffic in the core.

14. A data storage device having a set of processor-executable instructions stored thereon, the set of processor-executable instructions comprising:

instructions identifying misconfigurations to a Dynamic Host Configuration Protocol (DHCP) option/suboption configuration of a DHCP agent between a DHCP server and a client of the DHCP server;

instructions for confirming proper address concentration configuration with respect to the DHCP agent;

instructions for snooping on address assignments from the DHCP server to the client of the DHCP server to determine unauthorized ones of said address assignments; and instructions for interpreting DHCP-related configuration information to verify that said configuration information translates into a correct set of services for a client thereof, wherein said configuration information includes information relating to misconfiguration to the DHCP option/suboption configuration, information relating to proper address concentration configuration with respect to the DHCP agent, and information relating to address assignments from the DHCP server to the client of the DHCP server;

wherein identifying misconfigurations to the DHCP option configurations includes:

a DHCP Link probe function utilizing a DHCP leasequery function for requesting DHCP agent information from a binding database maintained by the DHCP server;

receiving from the DHCP server said DHCP agent information;

determining that said received DHCP agent information differs from DHCP agent information previously received from the DHCP server thereby discovering misconfiguration of said received DHCP agent information.

15. The system of claim 14 wherein the DHCP option includes a DHCP option that enables a DHCP agent to include information about itself in a client-originated DHCP packet when forwarding the client-originated DHCP packet to the DHCP server.

16. The system of claim 14 wherein identifying said misconfigurations includes verifying DHCP agent information modified by an originating relay agent and corresponding information recorded in a binding database of the DHCP server on behalf of the client.

17. The system of claim 14 wherein confirming proper address concentration configuration includes confirming that the DHCP agent is properly configured for replacing client addresses with its own addresses as the main source addresses for DHCP requests.

18. The system of claim 14 wherein confirming proper address concentration configuration includes verifying that the DHCP agent is configured for changing broadcast addresses to a unicast server address for further cut-back from the excess traffic in the core.

* * * * *